(12) United States Patent
Kehoe

(10) Patent No.: US 7,165,658 B1
(45) Date of Patent: Jan. 23, 2007

(54) EMERGENCY BANKING DEVICE

(76) Inventor: Peter J. Kehoe, 137 Bradlee Rd., Milton, MA (US) 02186

( * ) Notice: Subject to any disclaimer, the term of this patent is extended or adjusted under 35 U.S.C. 154(b) by 0 days.

(21) Appl. No.: 10/997,541

(22) Filed: Nov. 26, 2004

(51) Int. Cl.
*B60B 39/00* (2006.01)
(52) U.S. Cl. .......................... 188/4 R; 188/2 D; 188/5
(58) Field of Classification Search ................ 188/4 R, 188/5, 32, 2 D, 68, 82.2
See application file for complete search history.

(56) References Cited

U.S. PATENT DOCUMENTS

| 1,392,987 | A | * | 10/1921 | Unruh | ........................ | 188/4 R |
| 2,174,135 | A | * | 9/1939 | Parrish | ........................ | 188/4 R |
| 2,224,785 | A | * | 12/1940 | Greene | ........................ | 188/4 R |
| 2,746,507 | A | * | 5/1956 | Morgan | ........................ | 152/214 |
| 2,868,333 | A | * | 1/1959 | Willison | ........................ | 188/4 R |
| 3,212,550 | A |   | 10/1965 | Saunders | | |
| 3,601,173 | A |   | 8/1971 | Anderson | | |
| 3,865,577 | A | * | 2/1975 | Gottschol et al. | ........... | 428/576 |
| 4,024,900 | A |   | 5/1977 | Thomas | | |
| 4,227,562 | A |   | 10/1980 | Adair | | |
| 4,679,608 | A |   | 7/1987 | Jeindl | | |
| 4,800,939 | A |   | 1/1989 | Torneback | | |

\* cited by examiner

*Primary Examiner*—Melody M. Burch

(57) ABSTRACT

An auxiliary braking device includes a plurality of arcuate housings provided with a plurality of respective sleeves. The housings have an open end portion disposed in front of the vehicle tires. A plurality of flexible chain pads are included that have a plurality of interlocked rings. The chain pads have a width greater than a width of the tires and are stored within the housing sleeves. The present invention further includes a plurality of elongated flexible arms having a plurality of first end portions secured to the chain pads and a plurality of second end portions. A mechanism is included for releasing the chain pads from the open end portions of the housings while the vehicle is in motion. The releasing mechanism is connected to the second end portions of the arms.

15 Claims, 5 Drawing Sheets

EMERGENCY BANKING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to braking devices and, more particularly, to an emergency braking device for assisting an operator to instantly stop a moving vehicle without actuating a vehicle's primary braking system.

2. Prior Art

Lack of traction for mobility and for stopping on slick and ice covered pavements has plagued motorists in spite of snow and rain tires. Calls for tow trucks swamp garages and service stations because of cars that can no longer move on the slick and ice covered pavements.

A great number of known tire chains have an inner support constituted by a support ring made of a spring steel wire which may be closed by means of a tensioning chain guided in a pulley block-like arrangement. The tensioning chain is passed across the running face of the tire forwardly to the outer support and closed together therewith.

In other known tire chains of the above type, the inner support is constituted by a support ring made of spring steel wire that has a hook connection which may be closed or opened in a simple manner. For the outer support, independently from such a closed device of the inner support, a separate tensioning chain is provided which connects the open ends of the outer support, formed, for example, as a lateral chain. After a few yards of displacement of the vehicle, the tensioning chain has to be retightened because the runner chains assume their position within the contacting ellipse (that is, the engagement area between tire and road) only after several rotations of the tire.

It is thus a disadvantage of all known tire chains, that subsequently to their mounting on the tires, the vehicle has to be driven a few yards in order to ensure that the tire chain, particularly the runner chains, assume their correct position, and the tensioning chains have to be retightened manually.

Accordingly, a need remains for an emergency braking device that overcomes the above-noted shortcomings. The present invention satisfies such a need by providing an emergency braking device that is easily installed, and provides safety and peace of mind to concerned travelers. The gripping feature of the emergency chain pads significantly increases friction and traction with the roadway, thus preventing sliding accidents and serious vehicular damage. In turn, higher insurance rates, injuries and possible fatalities are avoided through the use of this device. Such a device is advantageously adaptable to a variety of different vehicles while remaining cost effective.

BRIEF SUMMARY OF THE INVENTION

In view of the foregoing background, it is therefore an object of the present invention to provide an emergency braking device. These and other objects, features, and advantages of the invention are provided by an auxiliary braking device for advantageously assisting an operator to instantly stop a moving vehicle without actuating a vehicle's primary braking system.

The auxiliary braking device includes a plurality of arcuate housings provided with a plurality of respective sleeves extending along a plurality of vehicle tires. Such housings are spaced from the vehicle tires generally along a quadrant defined adjacent to a forward rotational path of the vehicle tires. The housings have an open end portion disposed in front of the vehicle tires.

A plurality of flexible chain pads are included that have centrally disposed longitudinal axes and further include a plurality of interlocked rings. Such rings preferably each have a plurality of randomly spaced protrusions extending outwardly therefrom. The protrusions advantageously improve surface area contact with the vehicle tires and the support surface during operating conditions. The chain pads have a width greater than a width of the vehicle tires respectively and are conveniently stored within associated ones of the housing sleeves during driving conditions.

The present invention further includes a plurality of elongated flexible arms having a plurality of first end portions secured to the chain pads respectively. Such arms further have a plurality of second end portions. The arms may include a plurality of rings that have substantially smooth outer surfaces and are further equally spaced apart from the respective axes of the chain pads. Preferably, the chain pads are disposed rearwardly of the arms respectively.

Advantageously, a mechanism is included for releasing the chain pads from the open end portions of the housings while the vehicle is in motion such that the chain pads become sandwiched between the vehicle tires and a support surface and abruptly halt the vehicle tires. Such a releasing mechanism is connected to the housings. The releasing mechanism preferably includes a handle and a plurality of cables having first end portions attached thereto and further has second end portions extending outwardly and away along a partial length of the vehicle and connected to the rigid cross brace respectively. Such handles are conveniently disposed inside a vehicle cab such that the operator can readily access the handles while positioned inside the vehicle cab.

The releasing mechanism preferably further includes a rigid cross brace connected to a respective one of the cables, wherein the respective cable is disposed medially between opposing ends of the rigid cross brace such that the cables can be uniformly displaced between equilibrium and tensed positions. A plurality of pins pass through the housings and are securely connected thereto for effectively engaging opposed edge portions of the chain pads during driving conditions wherein the chain pads are disengageable from the pins when the operator actuates the handle and adapts the cables to the tensed position. Such pins are preferably situated adjacent to a rear edge portion of the housings respectively.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
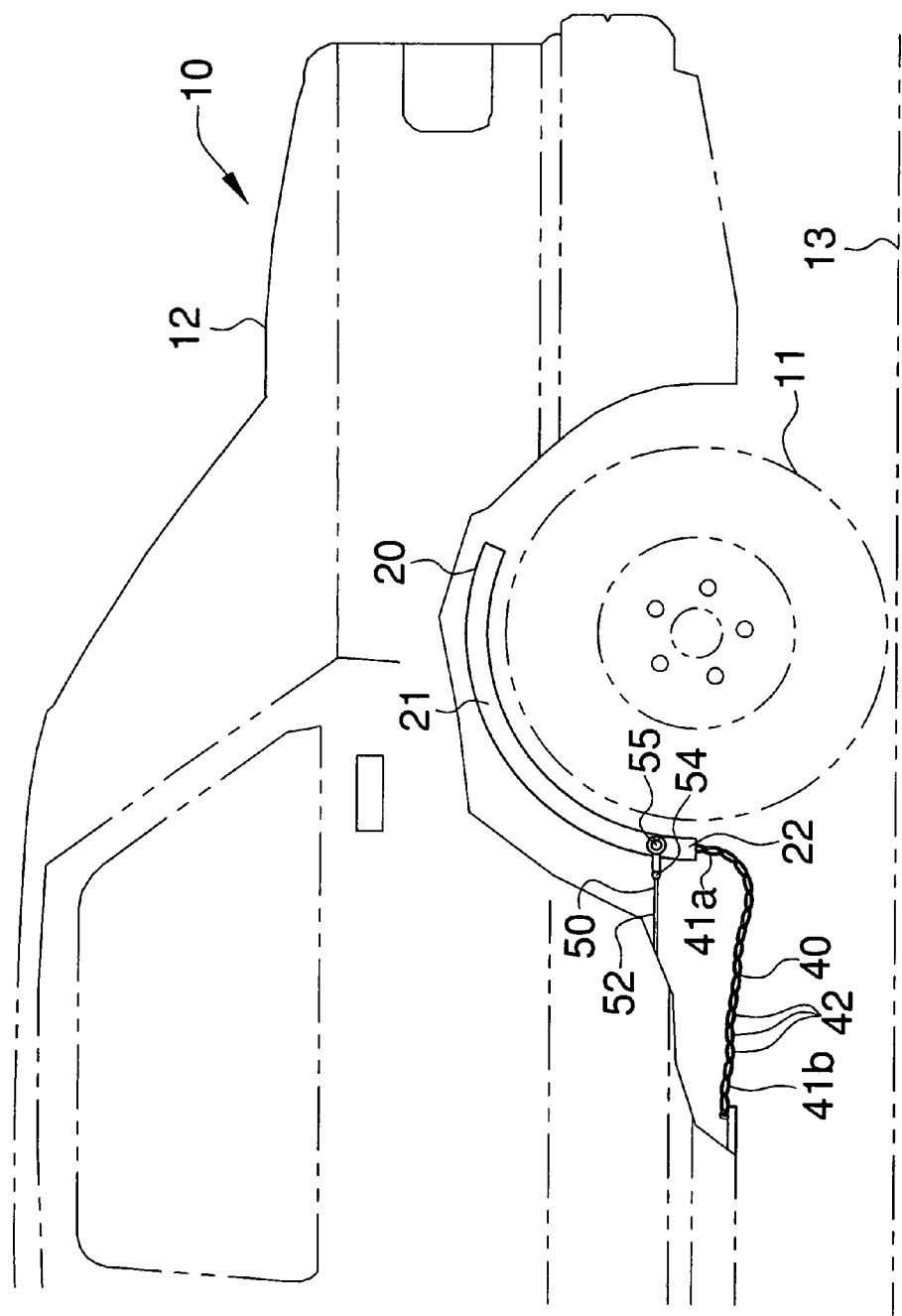
FIG. 1 is a side elevational view showing an auxiliary braking device, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1–5 by the reference numeral 10 and is intended to provide an emergency braking device. It should be understood that the device 10 may be used to stop many different types of vehicles and should not be limited to only passenger vehicles.

Referring initially to FIG. 1, the device 10 includes a plurality of arcuate housings 20 provided with a plurality of respective sleeves 21 extending along a plurality of vehicle tires 11 while advantageously not interfering with the rotational motion of the tires 11. Such housings 20 are spaced from the vehicle tires 11 generally along a quadrant defined adjacent to a forward rotational path of the vehicle tires 11. The housings 20 have an open end portion 22 disposed in front of the vehicle tires 11.

Figure 2:
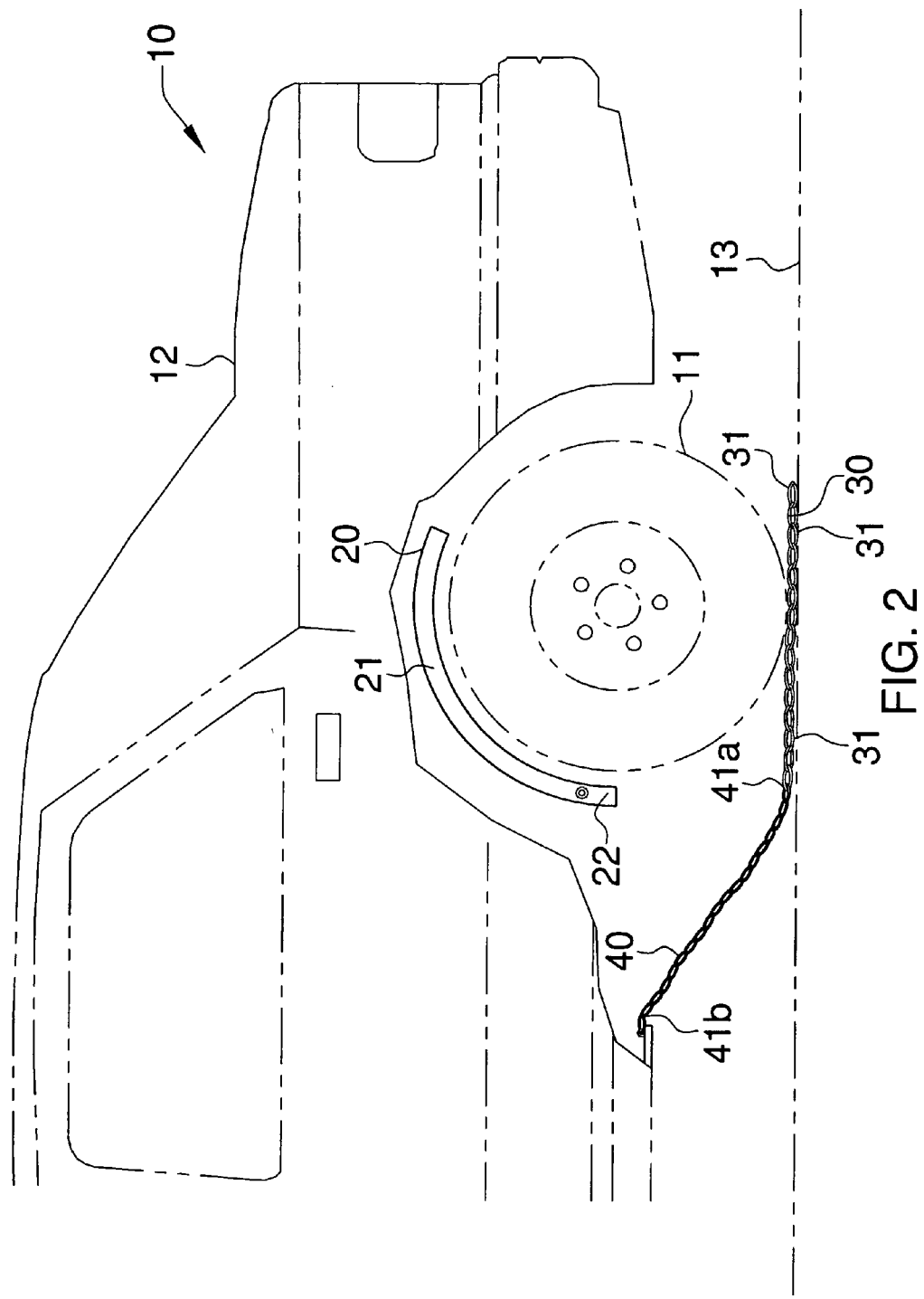
FIG. 2 is a side elevational view of the device shown in FIG. 1, during operating conditions.
Figure 3:
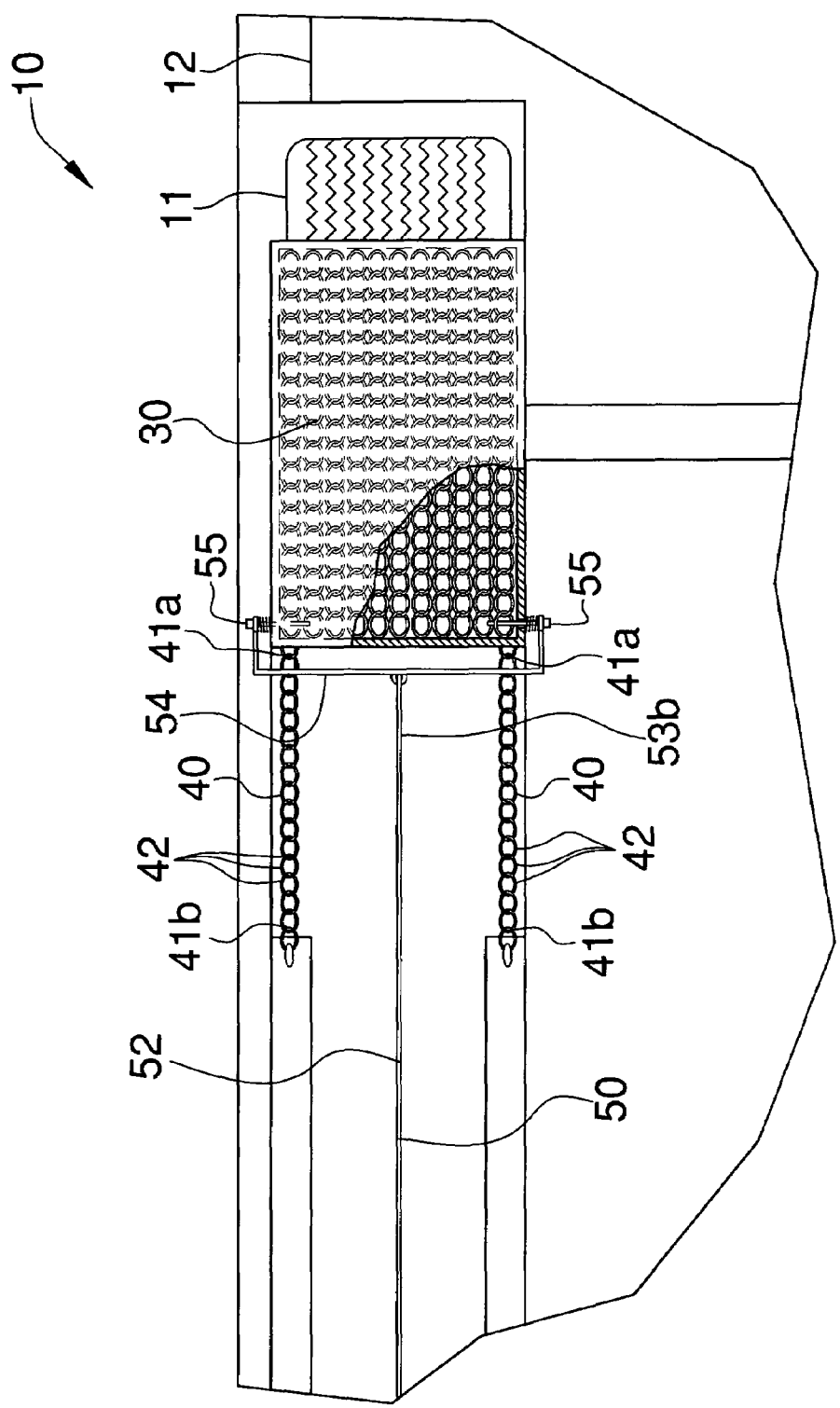
FIG. 3 is a bottom plan view of the device shown in FIG. 2, showing the chain pads positioned under the vehicle tires.
Figure 4:
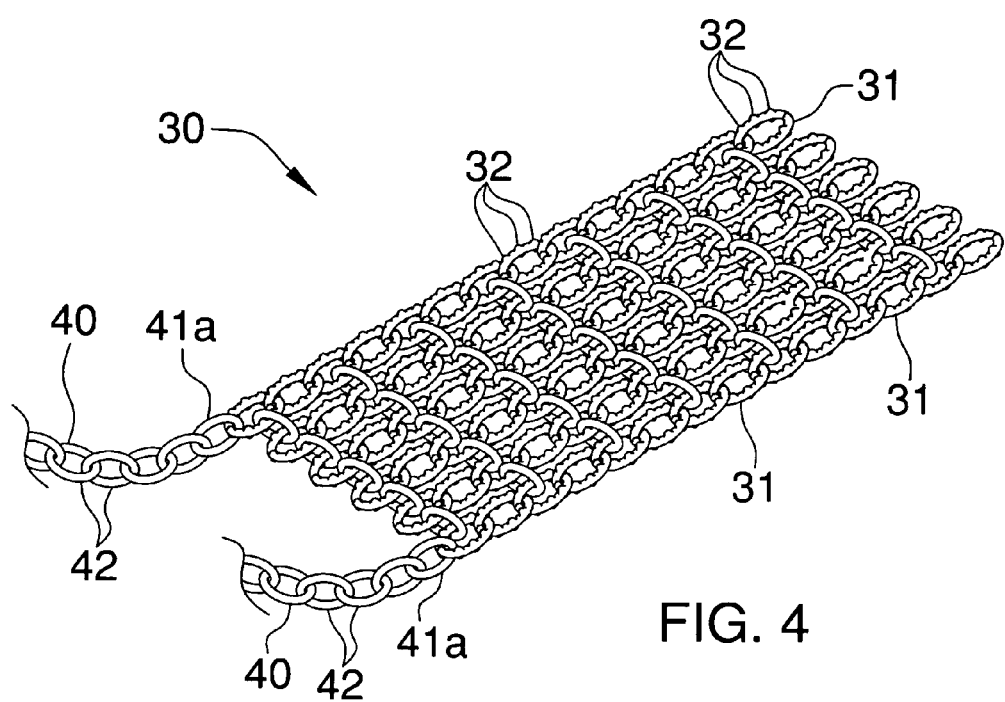
FIG. 4 is a perspective view of the chain pads shown in FIG. 3.

Referring to FIGS. 2, 3 and 4, a plurality of flexible chain pads 30 are included that have centrally disposed longitudinal axes and further include a plurality of interlocked rings 31. Such rings 31 preferably each have a plurality of randomly spaced protrusions 32 extending outwardly therefrom. The protrusions 32 advantageously improve surface area contact with the vehicle tires 11 and the support surface 13 during operating conditions, thus advantageously causing the vehicle 12 to stop more rapidly when the chain pads 30 are employed. The chain pads 30 have a width greater than a width of the vehicle tires 11 respectively and are conveniently stored within associated ones of the housing sleeves 21 during driving conditions. Such a greater width of the chain pads 30 advantageously ensures that the entire surface of the tire 11 in contact with the support surface 13 is engaged by the pads 30, thus increasing the efficiency of the device 10.

Referring to FIGS. 1 through 4, the present invention further includes a plurality of elongated flexible arms 40 having a plurality of first end portions 41A secured to the chain pads 30 respectively. Such arms 40 further have a plurality of second end portions 41B. The arms 40 include a plurality of rings 42 that have substantially smooth outer surfaces and are further equally spaced apart from the respective axes of the chain pads 30. The chain pads 30 are disposed rearwardly of the arms 40 respectively.

Figure 5:
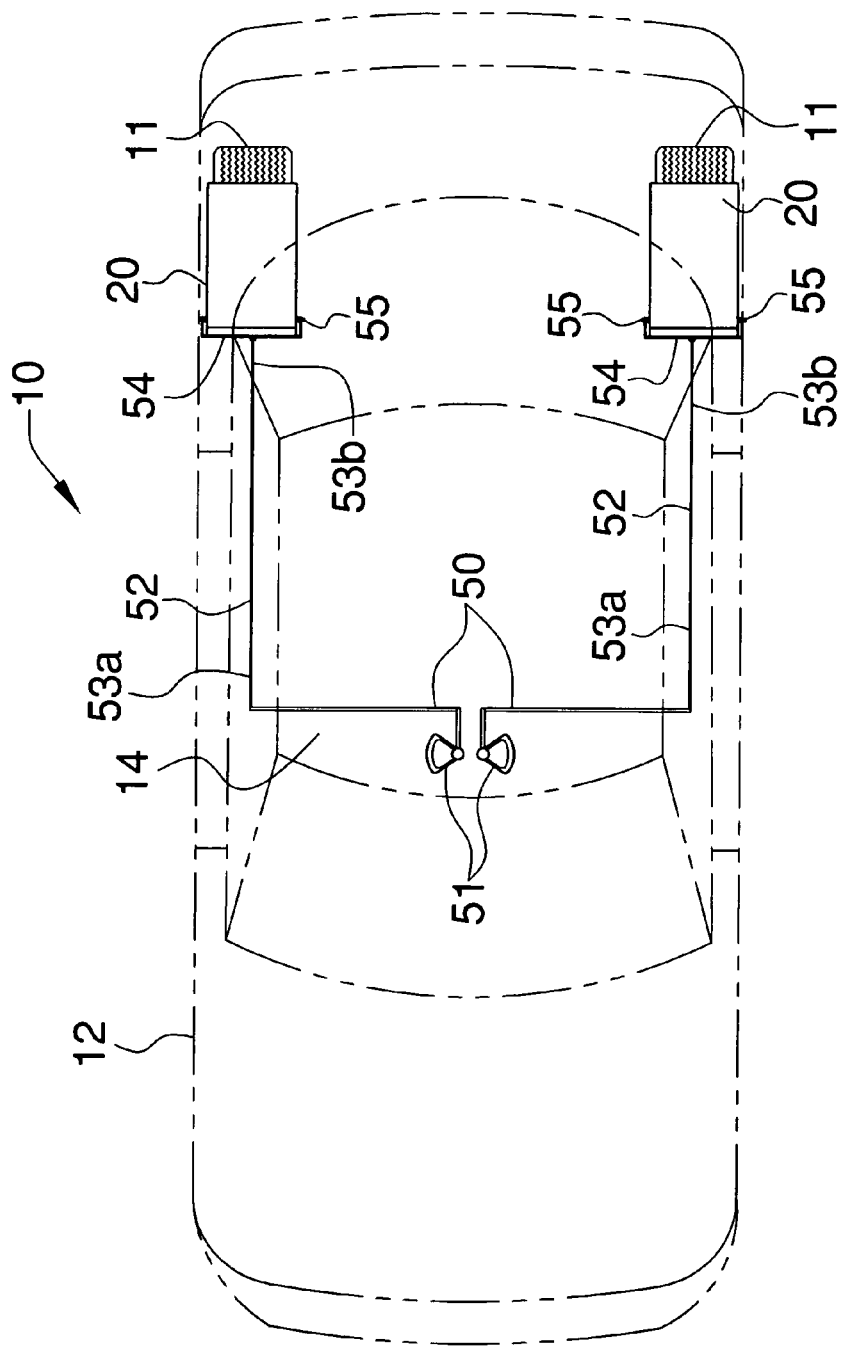
FIG. 5 is a top plan view of the device shown in FIG. 1, showing the releasing mechanism.

Referring to FIGS. 1, 3 and 5, advantageously, a mechanism 50 is included for releasing the chain pads 30 from the open end portions 22 of the housings 20 while the vehicle 12 is in motion such that the chain pads 30 become sandwiched between the vehicle tires 11 and a support surface 13 and abruptly halt the vehicle tires 11. Such a releasing mechanism 50 is connected to the housings 20. The releasing mechanism 50 includes a handle 51 and a plurality of cables 52 having first end portions 53A attached thereto and further has second end portions 53B extending outwardly and away along a partial length of the vehicle 12 and connected to the rigid cross brace 54 respectively. Such handles 51 are conveniently disposed inside a vehicle cab 14 such that the operator can readily access the handles 51 while positioned inside the vehicle cab 14.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An auxiliary braking device for assisting an operator to instantly stop a moving vehicle without actuating a vehicle's primary braking system, said auxiliary braking device comprising:

a plurality of arcuate housings extending along a plurality of vehicle tires, said housings being spaced from the vehicle tires generally along a quadrant defined adjacent to a forward rotational path of the vehicle tires;

a plurality of flexible chain pads having centrally disposed longitudinal axes and comprising a plurality of interlocked rings, said chain pads having a width greater than a width of the vehicle tires respectively and being stored within associated ones of said housings during driving conditions;

a plurality of elongated flexible arms having a plurality of first end portions secured to said chain pads respectively, said arms further having a plurality of second end portions; and means for releasing said chain pads from said housings while the vehicle is in motion such that said chain pads become sandwiched between the vehicle tires and a support surface and abruptly halt the vehicle tires, said releasing means being connected to said second end portions of said arms;

wherein said releasing means comprises a plurality of handles and a plurality of cables having first end portions attached thereto and further having second end portions extending outwardly and away along a partial length of the vehicle and connected to said arms respectively, said handles being disposed inside a vehicle cab such that the operator can readily access said handles while positioned inside the vehicle cab;

a rigid cross brace connected to a respective one of said cables, wherein said respective cable is disposed medially between opposing ends of said rigid cross brace such that said cables can be uniformly displaced between equilibrium and tensed positions; and a plurality of pins passing through said housings and securely connected thereto for engaging opposed edge portions of said chain pads during driving conditions.

2. The braking device of claim 1, wherein said rings each have a plurality of randomly spaced protrusions extending outwardly therefrom, said protrusions for improving surface area contact with the vehicle tires and the support surface during operating conditions.

3. The braking device of claim 1, wherein said chain pads are disposed rearwardly of said arms respectively.

4. The braking device of claim 1, wherein said arms comprise: a plurality of rings having substantially smooth outer surfaces, said arms being equally spaced apart from the respective axes of said chain pads.

5. The braking device of claim 1, wherein said pins are situated adjacent a rear edge portion of said housings respectively.

6. An auxiliary braking device for assisting an operator to instantly stop a moving vehicle without actuating a vehicle's primary braking system, said auxiliary braking device comprising:

a plurality of arcuate housings extending along a plurality of vehicle tires, said housings being spaced from the vehicle tries generally along a quadrant defined adjacent to a forward rotational path of the vehicle tires, said housings having an open end portion disposed in front of the vehicle tires;

a plurality of flexible chain pads having centrally disposed longitudinal axes and comprising a plurality of interlocked rings, said chain pads having a width greater than a width of the vehicle tires respectively and being stored within associated ones of said housing during driving conditions;

a plurality of elongated flexible arms having a plurality of first end portions secured to said chain pads respectively, said arms further having a plurality of second end portions; and means for releasing said chain pads from said open end portions of said housings while the vehicle is in motion such that said chain pads become sandwiched between the vehicle tires and a support surface and abruptly halt the vehicle tires, said releasing means being connected to said second end portions of said arms;

wherein said releasing means comprises a plurality of handles and a plurality of cables having first end portions attached thereto and further having second end portions extending outwardly and away along a partial length of the vehicle and connected to said arms respectively, said handles being disposed inside a vehicle cab such that the operator can readily access said handles while positioned inside the vehicle cab;

a rigid cross brace connected to a respective one of said cables, wherein said respective cable is disposed medially between opposing ends of said rigid cross brace such that said cables can be uniformly displaced between equilibrium and tensed positions; and a plurality of pins passing through said housings and securely connected thereto for engaging opposed edge portions of said chain pads during driving conditions.

7. The braking device of claim 6, wherein said rings each have a plurality of randomly spaced protrusions extending outwardly therefrom, said protrusions for improving surface area contact with the vehicle tires and the support surface during operating conditions.

8. The braking device of claim 6, wherein said chain pads are disposed rearwardly of said arms respectively.

9. The braking device of claim 6, wherein said arms comprise: a plurality of rings having substantially smooth outer surfaces, said arms being equally spaced apart from the respective axes of said chain pads.

10. The braking device of claim 6, wherein said pins are situated adjacent a rear edge portion of said housings respectively.

11. An auxiliary braking device for assisting an operator to instantly stop a moving vehicle without actuating a vehicle's primary braking system, said auxiliary braking device comprising:

a plurality of arcuate housings provided with a plurality of respective sleeves and extending along a plurality of vehicle tires, said housings being spaced from the vehicle tires generally along a quadrant defined adjacent to a forward rotational path of the vehicle tires, said housings having an open end portion disposed in front of the vehicle tires;

a plurality of flexible chain pads having centrally disposed longitudinal axes and comprising a plurality of interlocked rings, said chain pads having a width greater than a width of the vehicle tires respectively and being stored within associated ones of said housing sleeves during driving conditions;

a plurality of elongated flexible arms having a plurality of first end portions secured to said chain pads respectively, said arms further having a plurality of second end portions, said housings being located rearward of said arms respectively; and means for releasing said chain pads from said open end portions of said housings while the vehicle is in motion such that said chain pads become sandwiched between the vehicle tires and a support surface and abruptly halt the vehicle tires, said releasing means being directly connected to said second end portions of said arms;

wherein said releasing means comprises a plurality of handles and a plurality of cables having first end portions attached thereto and further having second end portions extending outwardly and away along a partial length of the vehicle and connected to said arms respectively, said handles being disposed inside a vehicle cab such that the operator can readily access said handles while positioned inside the vehicle cab;

a rigid cross brace directly connected to a respective one of said cables, wherein said respective cable is disposed medially between opposing ends of said rigid cross brace such that said cables can be uniformly displaced between equilibrium and tensed positions; and a plurality of pins passing through each of said housings and securely connected thereto for engaging opposed edge portions of said chain pads during driving conditions, said pins being connected to said cross-braces.

12. The braking device of claim 11, wherein said rings each have a plurality of randomly spaced protrusions extending outwardly therefrom, said protrusions for improving surface area contact with the vehicle tires and the support surface during operating conditions.

13. The braking device of claim 11, wherein said chain pads are disposed rearwardly of said arms respectively.

14. The braking device of claim 11, wherein said arms comprise: a plurality of rings having substantially smooth outer surfaces, said arms being equally spaced apart from the respective axes of said chain pads.

15. The braking device of claim 11, wherein said pins are situated adjacent a rear edge portion of said housings respectively.

* * * * *